United States Patent [19]

Van Duyne et al.

[11] Patent Number: 5,451,858
[45] Date of Patent: Sep. 19, 1995

[54] AUTOMATIC EQUAL-PHASE SYNCHRONIZER FOR A VARYING NUMBER OF SYNCHRONIZED UNITS

[75] Inventors: Jeffrey L. Van Duyne, Cinnaminson, N.J.; William J. Laughton, Syracuse, N.Y.

[73] Assignee: Martin Marietta Corp., East Windsor, N.J.

[21] Appl. No.: 100,399

[22] Filed: Aug. 2, 1993

[51] Int. Cl.$^6$ .................................................. G05F 1/40
[52] U.S. Cl. ....................................... 323/281; 323/288
[58] Field of Search ............... 323/273, 281, 282, 288, 323/242, 243, 303, 312, 313; 307/15, 19, 44, 46, 48, 50, 53, 62

[56] References Cited

U.S. PATENT DOCUMENTS

| | | | |
|---|---|---|---|
| 4,591,734 | 5/1986 | Laughton | 307/248 |
| 4,849,661 | 7/1989 | Bazes | 323/281 |
| 4,920,309 | 4/1990 | Szepesi | 323/281 |
| 4,939,443 | 7/1990 | Pollmeier et al. | 323/288 |
| 5,194,802 | 3/1993 | Hill et al. | 323/281 |

*Primary Examiner*—Steven L. Stephan
*Assistant Examiner*—Matthew V. Nguyen
*Attorney, Agent, or Firm*—W. H. Meise; C. A. Berard; S. A. Young

[57] ABSTRACT

A spacecraft (10) includes N paralleled power converters (24a, 24b ...) for producing current pulses in response to converter synchronizing pulses. The current pulses are integrated (28) to produce an operating direct voltage. The synchronizing pulses are produced in a recurrent cycle by a synchronizer (30). The synchronizer includes a voltage divider (320) with equal series-connected elements (324a, 324b ...), each of which is paralleled by a shorting switch (330a, 330b ...). A sawtooth signal generator (310) produces a sawtooth signal (312), which is applied in common to each of a plurality of comparators (332a, 332b ...). The voltage divider (320) is connected across a reference voltage (318), to produce a plurality of reference voltages at the taps (328a, 328b). Each comparator (332) compares the sawtooth ramp (314) with one of the reference voltages, so that the comparators trigger in sequence as the ramp rises. The comparators trigger at times corresponding to equal phase increments of 360°/N at the ramp recurrence frequency, where N is the number of power converters being driven. If a power converter fails, it produces a NOGO signal, which causes the associated voltage divider switch to close, to thereby short-circuit one of the divider elements. This redistributes the phase increments, so the remaining power converters continue to be synchronized in equal phase increments.

8 Claims, 4 Drawing Sheets

AUTOMATIC EQUAL-PHASE SYNCHRONIZER FOR A VARYING NUMBER OF SYNCHRONIZED UNITS

This invention relates to arrangements for generating synchronizing signals spaced apart in phase by 360°/N, where N is the number of signals which are to be used.

BACKGROUND OF THE INVENTION

In spacecraft intended for long lifetimes, electrical power is supplied by solar panels and stored in batteries. The electrical power is distributed by way of a power bus to electricity-using communications, attitude control, sensing and/or other systems as required from time to time. The solar panels may at any particular time produce more or less electrical power than is being consumed, with the difference being supplied to or from storage batteries. In order to accommodate the varying voltages and impedance characteristics of the solar panels and the batteries during use, to supply a controlled voltage on the spacecraft power bus, and to power the spacecraft during eclipse, bidirectional power conversion between the bus and the batteries is required. A power converter efficiently couples power among the various electrical devices. High efficiency is ordinarily accomplished by operation in one of the well-known switched modes, as opposed to a linear mode. In a switched operating mode, the power converter couples power by means of current pulses, which may be integrated at the end being supplied with power to produce a direct voltage. In order to achieve high reliability in a spacecraft context, and to reduce the total power which each power converter must handle, a number of power converters, such as ten converters, may be paralleled. All the paralleled converters should operate at the same switching frequency.

When power converters are paralleled, electromagnetic noise is reduced, and ripple of the integrated output voltage is also reduced, if the power converters are synchronized so that the current pulses which they produce occur sequentially over each switching period. For this to occur, the power converters must produce their current pulses evenly phased over each switching period in a sequential manner, i.e. they must be synchronized, and they must be synchronized in such a fashion that they produce their current pulses in a phase sequence of 360°/N, where N is the number of such converters. If there are ten paralleled converters, for example, they must produce their pulses at 36° phase increments, corresponding to 0°, 36°, 72°, 108°, 144°, 180°, 216°, 252°, 288°, 324°, 0°. Such a sequence may be generated by an oscillator driving a phase shifter array adjusted for the appropriate phase shifts at the oscillator frequency.

However, in a high-reliability context, it is desirable to be able to drop a malfunctioning converter from use, which reduces the number of operational converters. If the original phase sequence is followed, there will be a "hole" in the recurrent sequence of current pulses, which results in increased EMI and voltage ripple.

SUMMARY OF THE INVENTION

A spacecraft power system includes paralleled power converters for producing current pulses in response to converter synchronizing pulses. A reference voltage is applied to a voltage divider, in which each divider element is paralleled by a short-circuiting switch. A comparator is coupled to each of a number of taps of the voltage divider, so that each comparator is coupled to a reference voltage established by the elements of the divider. A sawtooth signal is applied in common to the comparators, so that the ramp portion of the sawtooth is simultaneously compared with the various reference voltages. The divider elements have equal values, so that the monotonic ramp voltage intersects the various tap voltages at times which are in equal phase increments of 360°/N at the ramp recurrence frequency, where N is the number of converters being driven. In the event of failure of a converter, it is taken off-line, and the corresponding short-circuiting switch is operated, thereby shorting out one of the elements of the voltage divider, which redistributes the phase increments, whereby the remaining converters continue to be synchronized by 360°/N, where N is a smaller number. In a particular embodiment of the invention, one of the divider elements is split into two equal portions, which appear at the end of the divider, to allow even phase increments between ramps.

DESCRIPTION OF THE INVENTION

Figure 1:
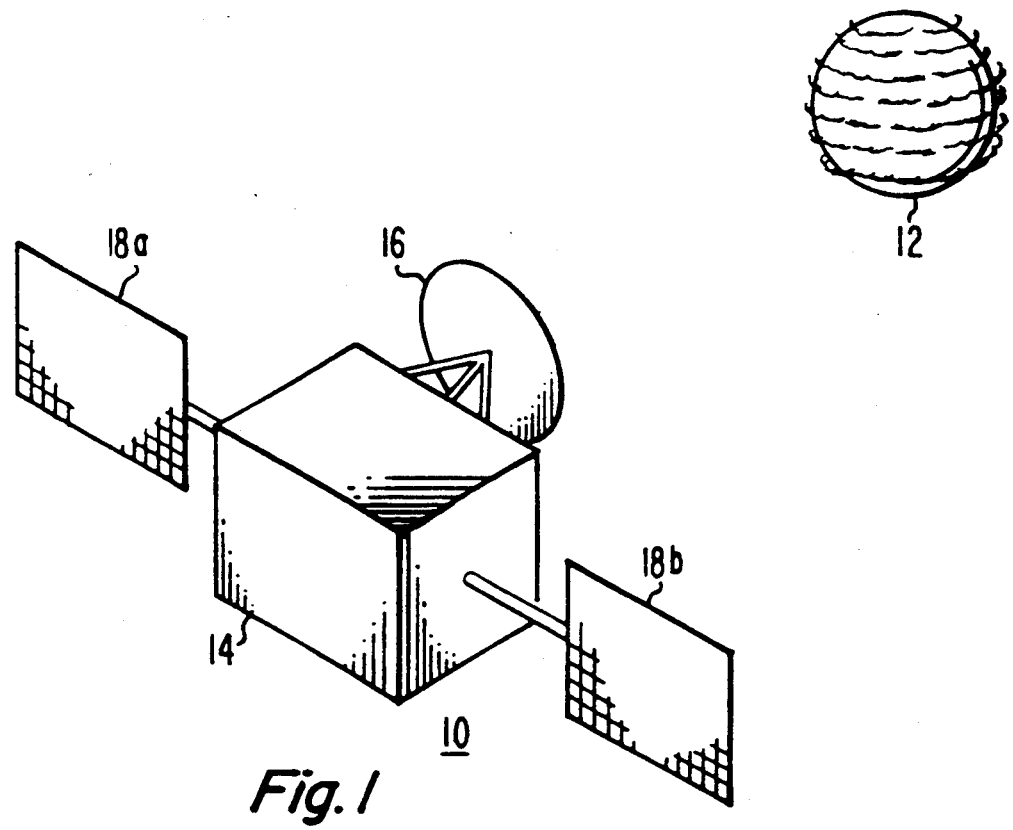
FIG. 1 is a simplified perspective or isometric view of a spacecraft including solar panels.

In FIG. 1, a spacecraft 10 orbiting a heavenly body 12 has a body 14 supporting a payload, illustrated as a communication antenna 16. Electrical power for housekeeping and for communication equipment (not illustrated) is provided by a pair of solar panels 18a and 18b.

Figure 2:
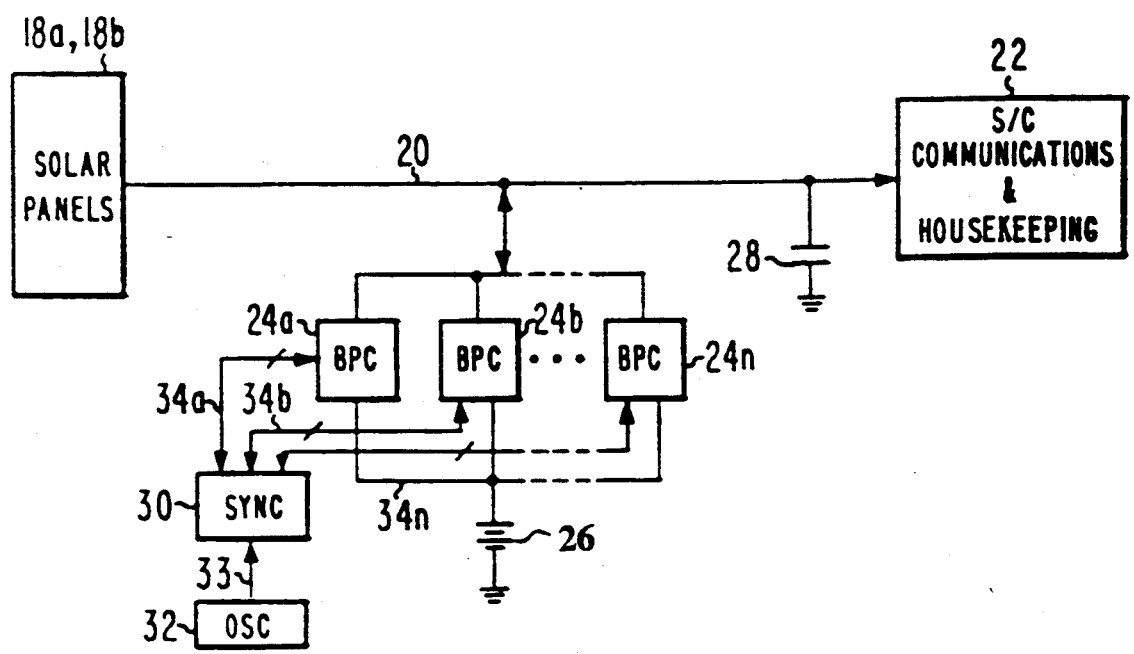
FIG. 2 is a simplified block diagram of a system which may be used in the spacecraft of FIG. 1 for controlling electrical power by means of synchronized paralleled bidirectional power converters.

FIG. 2 is a simplified block diagram of the electrical power and distribution system of spacecraft 10 of FIG. 1. In FIG. 2, solar panels 18a, 18b are coupled to a power bus 20, which couples power between the solar panels and a communication and housekeeping equipment load 22. When solar panels 18a, 18b produce more electrical power than is consumed by load 22, excess power is available, some of which is processed by an arrangement of paralleled bidirectional power converters (BPCs) 24a, 24b, . . . 24N, which couple the appropriate amount of excess power to a battery bank illustrated by a conventional battery symbol 26 for eclipse power storage.

When solar panels 18a, 18b produce less electrical power than load 22 consumes, the paralleled BPCs 24a, 24b, ... 24N couple energy from battery 26 and produce pulses of current on bus 20. A capacitor bank illustrated as 28 is coupled to power bus 20 for integrating the current pulses to produce the desired direct bus voltage. For this purpose, each BPC 24 includes a voltage sensing arrangement and feedback loop for controlling the magnitude of the current pulse, in known fashion. The magnitude control may be in the form of pulse width or pulse duration modulation.

As illustrated in FIG. 2, a synchronizer (sync) 30 receives master synchronizing signals from an oscillator 32, and generates polyphase converter synchronizing signals on conductors 34a, 34b, ... 34N for driving BPC converters 24a, 24b, ... 24N, respectively, so that the current pulses produced by the array of BPCs are at least initiated at equally spaced times during each master synchronizing interval. It should be understood that slight differences among the converters may result in differences in their current pulse durations, so that only the pulse start times or pulse end times, but not necessarily both, can be synchronized.

Figure 3:
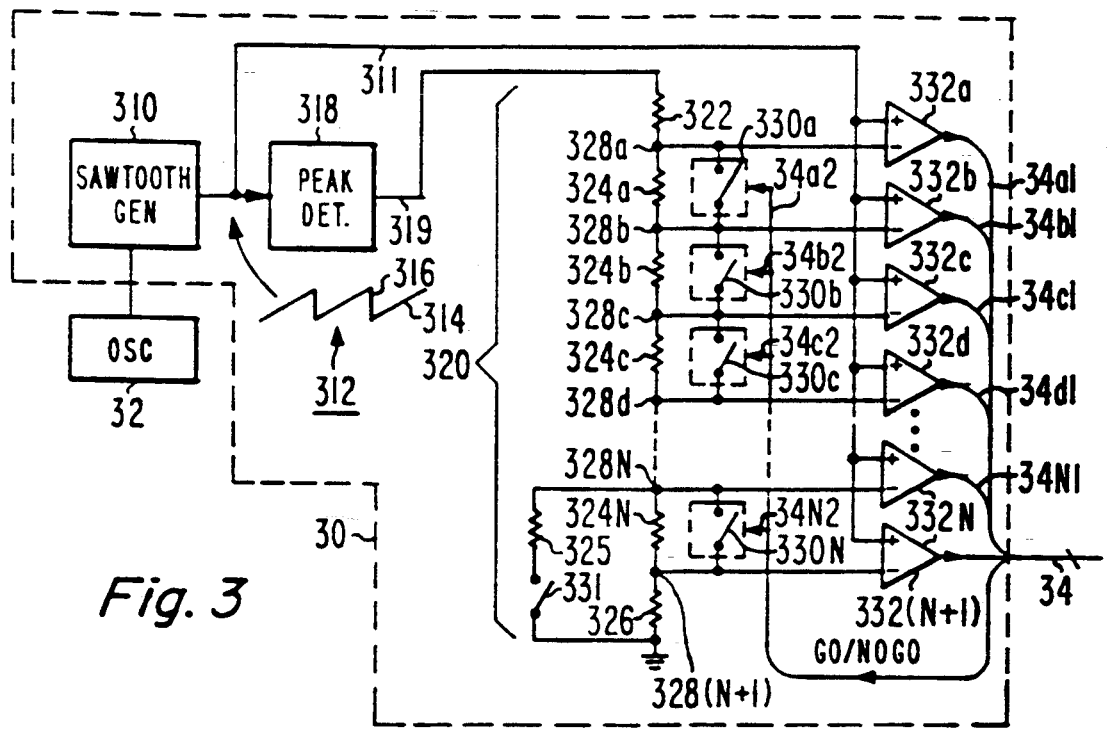
FIG. 3 is a simplified conceptual block diagram of details of an arrangement according to the invention, in which synchronization is accomplished by a sawtooth generator and a voltage divider in which the divider elements are paralleled by short-circuiting switches.

FIG. 3 is a simplified block and schematic diagram of a phase synchronizer according to the invention. Elements of FIG. 3 corresponding to those of FIG. 2 are designated by like reference numerals. In FIG. 3, oscillator 32 produces a master synchronizing signal, which is applied over a conductor 33 to drive a sawtooth generator 310 of synchronizer 30. Sawtooth generator 320 produces a sawtooth signal, illustrated generally as 312, which has recurrent ramp leading portions 314 followed by a sharp-sided drop 316. The sawtooth signal 312 produced by generator 310 is applied to a peak detector 318, and the resulting peak reference signal is applied to the upper end of a voltage divider designated generally as 320, and including resistors 322, 324a, 324b, 324c, ..., 324N, and 326. Each resistor 324a, 324b, 324c, ... 324N has a value designated R, and each resistor 322, 326 has a value R/2. A tap 328 of voltage divider 320 occurs at the end of each resistor 324; a tap 328a occurs at the top of resistor 324a, a tap 328b occurs between resistors 324a and 324b, a tap 328c occurs between resistors 324b and 324c, a tap 328d occurs at the lower end of resistor 324c, ..., resistor 324N lies between taps 328N and 328(N+1), and resistor 326 connects between tap 328(N+1) and a reference potential, represented as ground.

There are N series-connected resistors of value R, and two additional series-connected resistors of value R/2. The voltage increments between adjacent taps are equal in magnitude. The total resistance $R_{TOTAL}$ of the voltage divider 320 is therefore (N+1)R. The direct voltage of any tap $V_{TAP}$ equals the peak reference voltage, multiplied by the ratio $R_{TAP}$ of the total resistance between that tap and ground, divided by $R_{TOTAL}$.

$$V_{TAP} = V_{PEAK\ REF.}(R_{TAP}/R_{TOTAL}) \quad (1)$$

In the arrangement of FIG. 3, each resistor 324 of value R, is paralleled by a controllable short-circuiting switch 330; switch 330a parallels resistor 324a, switch 330b parallels resistor 324b, switch 330c parallels resistor 324c, ..., and switch 330N parallels resistor 324N. Each controllable switch 330 is controlled by a GO/NOGO signal applied over a conductor of bus 34; switch 330a parallels resistor 324a, switch 330b parallels resistor 324b, switch 330c parallels resistor 324c, ..., and switch 330N parallels resistor 324N. Each switch is open or nonconducting in the presence of a GO signal, and closed or conducting in the presence of a NOGO signal. Thus, the presence of a NOGO signal shorts out one of resistors 324, and changes the total resistance $R_{TOTAL}$ of the voltage division of voltage divider 320.

A further switch 331 in FIG. 3 is ganged for operation simultaneously with switch 330N, the lowermost switch associated with voltage divider 320. A resistor 325, having value 3R/4, is connected in series with the controlled path of switch 331, and the series combination is connected between node 328N and ground. Switch 331 closes simultaneously with switch 330N, in response to a NOGO signal on data path 34N2, to maintain the same resistance between node 328N and ground when resistance element 324N is bypassed.

Each comparator 332 of an array of comparators 332a, 332b, 332c, 332d, ..., 332N, 332(N+1) of FIG. 3 includes a inverting (−) input terminal coupled to a corresponding tap 328a, 328b, 328c, 328d, ... 328N, 328(N+1), respectively, of voltage divider 320. The noninverting (+) input terminals of comparators 332 are connected in common to the output of sawtooth generator 310. Each comparator compares sawtooth signal 312 with the voltage appearing at the associated tap 328 of voltage divider 320. As a result, when a ramp portion 314 of sawtooth signal 312 is initiated and increases monotonically, it sequentially reaches values equal to the various tap reference voltages, so that comparators 332 are triggered in sequence, beginning with comparator 332(N+1). Triggering of each comparator results in a transition at the output terminal of that comparator, so that the sequence of comparator output transitions together constitute the desired phase sequence. The output terminals of comparators 332 are coupled individually onto separate conductors 34a1, 34b1, 34c1, ... 34N1 of bus 34, for application of the transition to one of the binary power converters, for ultimately synchronizing the binary power converters of FIG. 2 in timed sequence.

Figure 4:
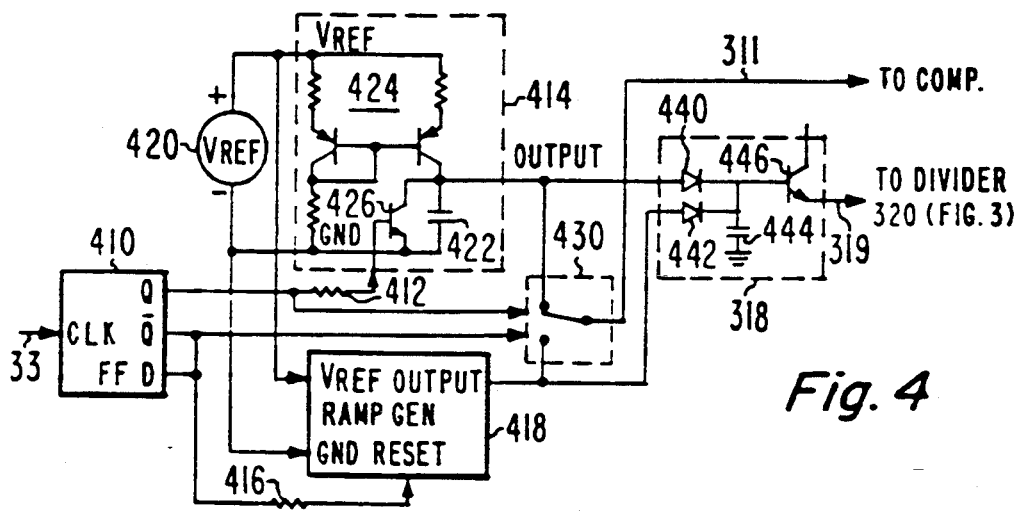
FIG. 4 is a simplified conceptual diagram, in block and schematic form, illustrating a preferred embodiment of the sawtooth generator of FIG. 3.
Figure 5A:
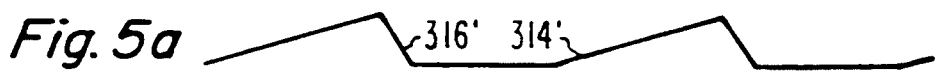
FIGS. 5a and 5b are illustrative voltage-time plots of the ramp voltages produced by the two ramp generators of FIG. 4.

The sawtooth signal illustrated as 312 in FIG. 3 includes a sharp, almost instantaneous reset portion illustrated as 316, which follows each monotonic ramp portion 314. FIG. 4 is a diagram, partially in schematic form and partially in block form, of preferred embodiments of sawtooth generator 310 and peak detector 318 of FIG. 3. In FIG. 4, master synchronizing signals are applied over a signal path 33 to the clock (CLK) input terminal of a D flip-flop (FF) 410. Flip-flop 410 divides the master clock or synchronizing signal into two separate, mutually out-of-phase signals at its Q and $\bar{Q}$ output terminals. The signal at the Q output terminal of FF 410 is applied through a resistor 412 to a RESET input port of a ramp generator 414, and the signal at the $\bar{Q}$ output terminal of FF 410 is applied to the D input and through a resistor 416 to a RESET input port of a ramp generator 418. A reference voltage generator 420, which may simply be a zener diode source, is connected between the reference (VREF) and ground (GND) terminals of ramp generators 414 and 418. Ramp generators 414 and 418 are identical, so only ramp generator 414 is described in detail. Ramp generator 414 includes an integrating capacitor 422 coupled between the reference ground (GND) port and an OUTPUT port. Capacitor 422 integrates current from a current source designated 424 to form a monotonic ramp signal. A bipolar NPN transistor 426 has its main collector-to-emitter current conducting path coupled across capacitor 422, for discharging the capacitor, thereby resetting the capacitor voltage to nominal zero voltage in response to a positive-going signal applied to its base from the RESET input port. During those intervals when the Q output terminal of FF 410 is LOW or negative, transistor 426 is nonconductive, and the voltage across capacitor 422 ramp is a positive-going ramp signal, similar to ramp portion 314' of FIG. 5a. When the Q output of the FF410 goes positive, transistor 426 becomes conductive, resulting in discharge of capacitor 422. Those skilled in the art know that transistor 426 cannot discharge capacitor 422 instantaneously, and that attempts to reduce the discharge time by increasing the peak current flow during discharge may result in damage to transistor 426, radio-frequency interference, or both. Consequently, the reset of ramp portion 314' of FIG. 5a is by way of a negative-going ramp portion 316' which may not be as rapid as desired. The desired reset is accomplished, according to another aspect of the invention, by operating second ramp generator 418 under the control of the signal at the D output of FF 410, whereby ramp generator 418 operates 180° out-of-phase relative to ramp generator 414, and produces a ramp signal illustrated as 314'' in FIG. 5b, which has a slow ramp reset 316''.

Figure 5B:
Figure 5C:
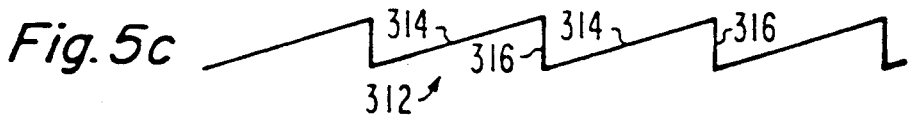
FIG. 5c is a plot of the sawtooth voltage produced by the pair of ramp generators and the multiplexer of FIG. 4.

A multiplexer 430 in FIG. 4 is connected to the OUTPUT terminals of ramp generators 414 and 418, and couples them alternatively to common signal path 311 under the control of the D and Q outputs of FF 410. FIG. 5c illustrates waveform 312, resulting from time multiplexing by multiplexer 430 of FIG. 4, and the time relation of waveform 312 to the signals of FIGS. 5a and 5b. As illustrated, ramp waveform portions 314 of FIG. 5c result from alternate coupling of ramp portions 314' and 314'' of FIGS. 5a and 5b, respectively. The reset ramp portions 316' and 316'' of FIGS. 5a and 5b are rejected by multiplexer 430 of FIG. 4, and do not appear in sawtooth signal 312 of FIG. 5c.

While a fixed direct reference voltage could be applied to voltage divider 320 of FIG. 3, some timing differences might result from variations of the peak ramp voltage relative to the voltage divider reference. Such variations might arise, for example, as a result of low-component aging or temperature variations. The arrangement of peak detector 318 coupled to sawtooth generator 310 and voltage divider 320 results in improved tracking and reduces timing errors. In FIG. 4, peak detector 318 is illustrated as including a peak detector diode 440 with its anode connected to the OUTPUT terminal of ramp generator 414, and a second peak detector diode 442 with its anode connected to the OUTPUT terminal of ramp generator 418. The cathodes of diodes 440 and 442 are coupled in common to an integrating capacitor 444. A bipolar buffer transistor 446 has its base connected to capacitor 444 and is connected as an emitter follower, to couple the peak detected ramp voltage by way of signal path 319 to voltage divider 320 of FIG. 3.

Figure 6A:
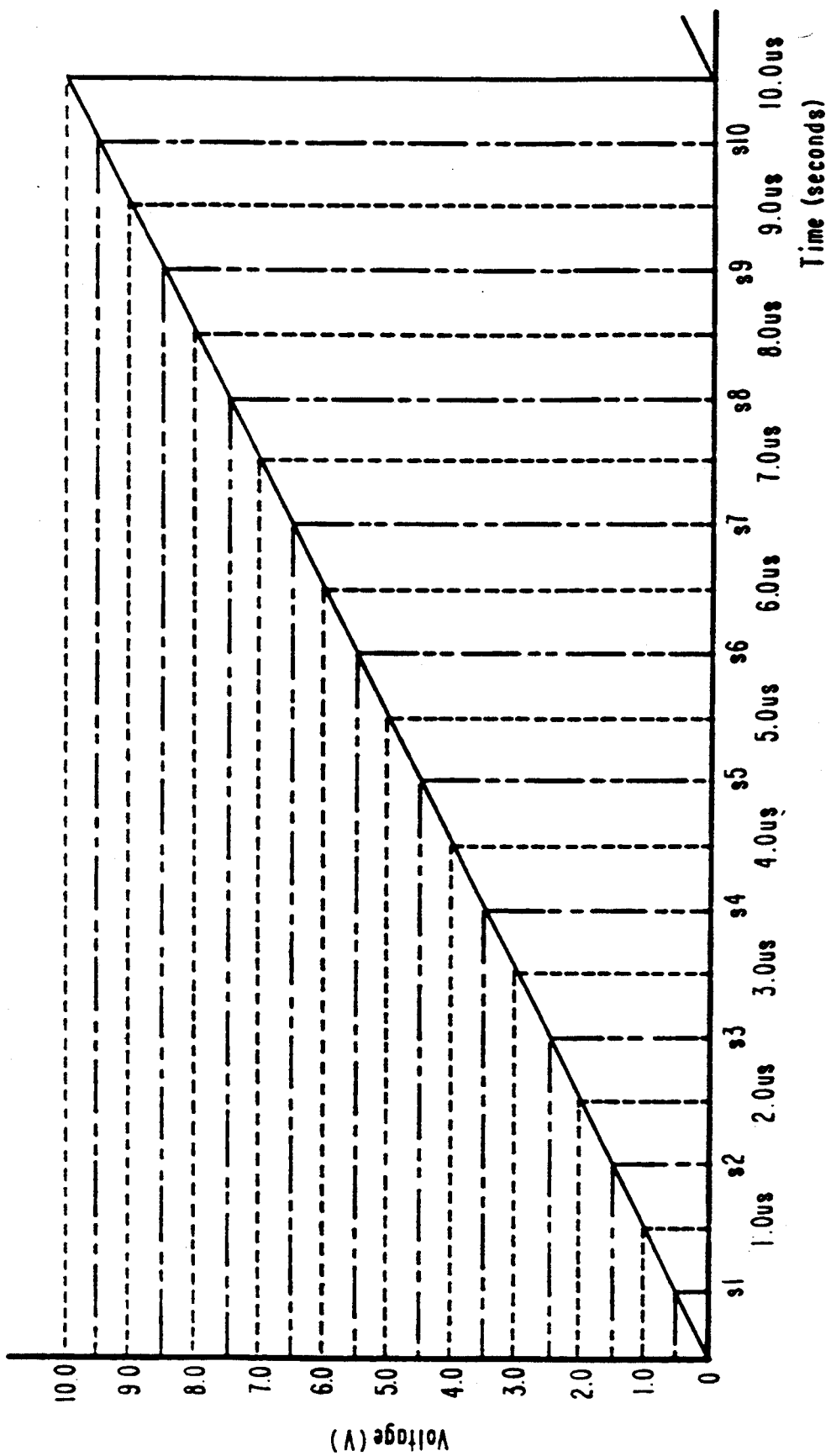
FIG. 6a is a voltage-time plot for the arrangement of FIG. 3 with a ten-output voltage divider, illustrating the equal phasing of the output synchronizing signals.

FIG. 6a is a plot of the voltage of one ramp 314 and one reset 316 of sawtooth 312 of FIG. 3, versus time, with ten operating bipolar power connectors. As illustrated, the ramp duration is about 10 $\mu$S, corresponding to a ramp repetition frequency of 100 KHz, and has an illustrative peak value of 10 volts. In FIG. 6a, long-short dash lines indicate the successive trigger points of comparators 332 of FIG. 3. With all the BPCs operational, all the GO/NOGO signals referred to in conjunction with FIG. 3 are in the GO state, and the switches 330 are therefore all open or nonconductive. Since all switches are open, the voltage division ratio of voltage divider 320 is the basic division ratio. The voltage of lowermost tap 328(N+1) is therefore $(10)*((R/2)/(10R))$, which corresponds to 10/20 or 0.5 volts. Thus comparator 332 (N+1) of FIG. 3 compares the ramp voltage with 0.5 volts, and produces a transition at time S1 of FIG. 6a, 0.5 $\mu$S after time zero at which the ramp is initiated, which results in triggering BPC 24N of FIG. 2. Comparator 332N of FIG. 3 compares the rising ramp voltage of FIG. 6a with the voltage at tap 328N, which is calculated as $(10)*((3R/2)/(10R))$, which corresponds to 30/20 or 1.5 volts. Comparator 332N of FIG. 3 produces a transition at time S2 of FIG. 6a, which is 1.5 $\mu$S after time zero. Similarly, each comparator 332 produces its transition in turn, when the rising ramp voltage intersects the corresponding tap voltage. Uppermost comparator 332a of FIG. 3 compares the rising ramp voltage of FIG. 6a with the voltage at tap 328a of FIG. 3, which is calculated as $(10)*((19/2)/(10R))$, which corresponds to 190/20 or 9.5 volts. Comparator 332a of FIG. 3 produces a transition at time S10 of FIG. 6a, which is 9.5 $\mu$S after time zero. Each successive transition $S_N$ of FIG. 6a occurs 1.0 $\mu$S after the previous transition $S_{N-1}$. The next transition following transition S10 of FIG. 6a will be a transition corresponding to transition S1, but associated with the next following ramp. The time interval between transition S10 of the ramp of FIG. 6a and the next following transition S1 occurs 0.5+0.5 $\mu$S or one $\mu$S after transition S10, thereby providing time continuity between successive ramps.

Figure 6B:
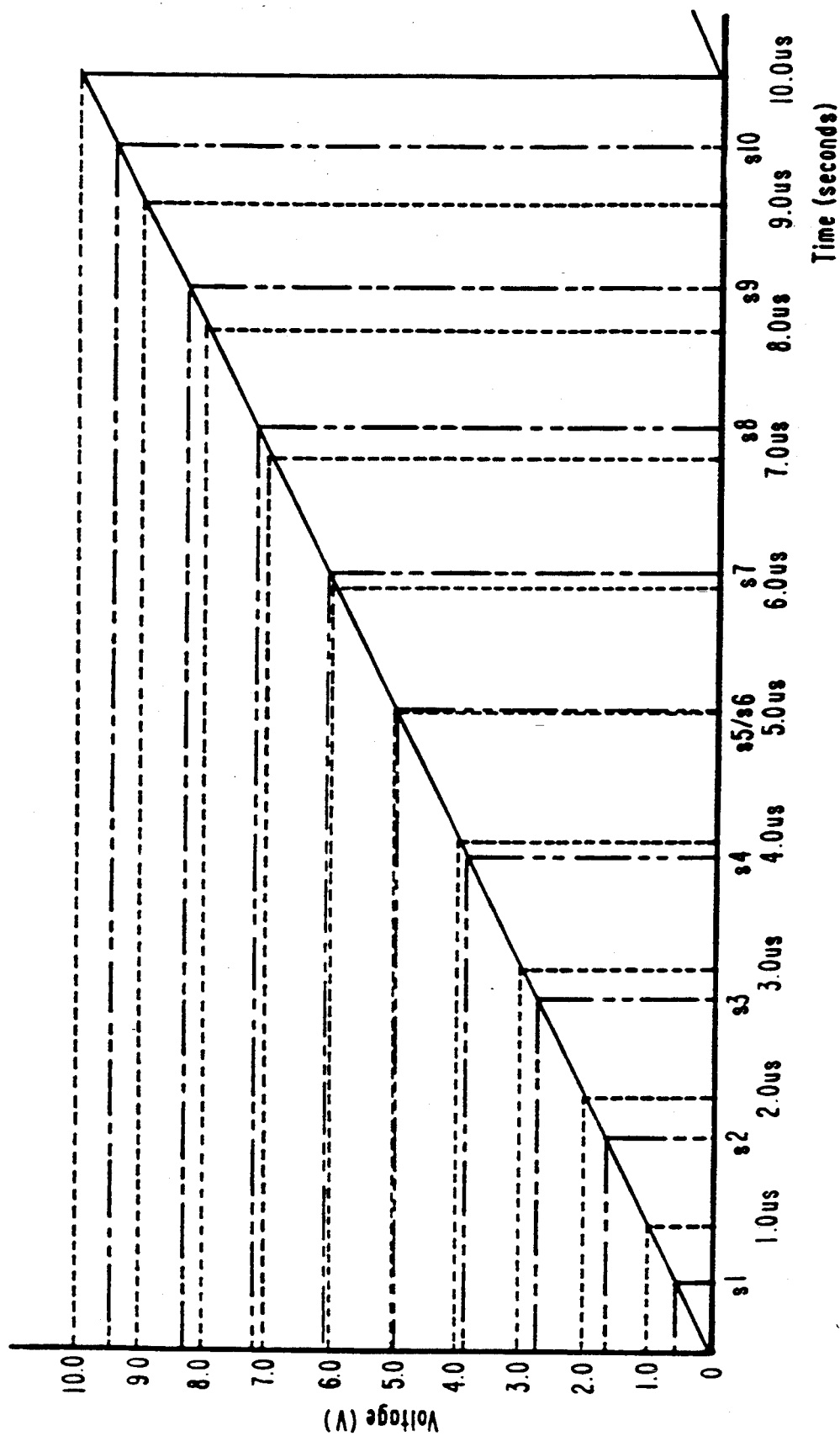
FIG. 6b is a corresponding plot with one of the switches, corresponding to sync pulse S6, thrown to reduce the number of effective outputs to nine, which are still equally phased.

FIG. 6b is a plot similar to that of FIG. 6a, including a ramp with a 10-volt peak value and a 10 $\mu$S duration. The plot of FIG. 6b differs from that of FIG. 6a in that a BPC 24 of FIG. 2, corresponding to the sixth out of ten, has experienced a failure, been taken off-line, and has produced a NOGO status indication. The NOGO signal causes a short circuiting switch 330 of FIG. 3 to become conductive and bypass one of the divider elements 324 of voltage divider 320. As a result, the total resistance $R_{TOTAL}$ becomes 9R instead of 10R. When the ramp begins to rise after time zero in FIG. 6b, lowermost comparator 332(N+1) of FIG. 3 triggers when the ramp reaches the voltage of tap 328(N+1), which is calculated as $(10)*((R/2)/(9R))$, which corresponds to 10/18 or 0.555 volts. Comparator 332(N+1) of FIG. 3 produces a transition at time S1 of FIG. 6b, which is 0.555 $\mu$S after time zero. Similarly, comparator 332N of FIG. 3 compares the rising ramp of FIG. 6b with the voltage at tap 328N of voltage divider 320, which is calculated as $(10)*((3R/2)/(9R))$, which corresponds to 30/18 or 1.666 volts. Comparator 332N of FIG. 3 produces a transition at time S2 of FIG. 6b, which is at 1.666 $\mu$S after time zero. Each comparator 332 of FIG. 3 produces its transition in turn. Since the sixth resistor element 332 (not illustrated in FIG. 3) is shorted, the two adjacent taps 328 are connected together, and are therefore at the same voltage. As a result, the corresponding comparators produce their transitions simultaneously, at the time indicated as S5/S6 in FIG. 6b. Since the BPC associated with one of the comparators has been taken off-line, its triggering is of no consequence. However, the transitions produced by the arrangement of FIG. 3 for the on-line BPCs are equally spaced in time from each other by 1.111 $\mu$S, so that the nine operating BPCs are now triggered at equally spaced times during the same 10 μS ramp interval. As mentioned, this has the salutary effect of tending to reduce electromagnetic interference and bus voltage ripple.

From the above explanation, it will be clear that when two or more BPCs are taken off-line and NOGO signals are produced, the remaining BPCs are rephased to be triggered at 360°/N degrees from each other.

Another advantage of the arrangement according to the invention is that a series of spacecraft may be fabricated, each of which includes a synchronizer according to the invention, all of which synchronizers are arranged to accommodate the maximum number of BPCs which might be needed. Construction of the spacecraft can proceed, even if the actual electrical load, and therefore the actual number of BPCs required, is not known until a later time, when a customer's mission requirements are available. At that time, the appropriate number of BPCs can be procured and installed, with the knowledge that their mutual phase synchronization is automatically established.

Other embodiments of the invention will be apparent to those skilled in the art. For example, circuits illustrated as analog, such as the ramp generators and/or peak detectors, may be implemented in the form of digital circuits as well known in the art. While a ramp peak voltage of 10 volts has been described, other voltages may of course be used. It may be desirable in some applications involving mass production of synchronizers to include as much as possible of the circuitry onto an ASIC. Ideally, each of the power converters also includes an independent oscillator, which becomes active in the event of failure of a sync signal.

What is claimed is:

1. A multiunit power supply for supplying direct voltage to a load, comprising:
   a current-integrating capacitor coupled across said load for integrating current pulses for generating said direct voltage;
   a plurality of energy units, each of which includes a synchronization signal input port, and each of which also includes a current output port coupled to said current-integrating capacitor for supplying current pulses thereto in response to periodic synchronizing signals applied to said synchronization signal input port;
   a source of master synchronizing signals; and
   phase synchronizing means including a master synchronizing signal input port coupled to said source of master synchronizing signals, and also including a plurality of synchronizing signal output ports, each of which synchronizing signal output ports is coupled to the synchronizing signal input port of one of said energy units, said phase synchronizing means further including: (a) ramp generating means coupled to receive said master synchronizing signals for generating successive ramp signals in synchronism with said master synchronizing signals; (b) a reference voltage source; (c) a voltage divider including a plurality of taps at least equal in number to the number of said energy units, and equal-value signal divider elements coupled, each of which is between two adjacent taps, said voltage divider being coupled to said reference voltage source, for forming a plurality of divided reference signals at the taps of said voltage divider, the divided reference signal at each of said taps being in a different proportion to said reference; (d) a plurality of comparators, each including a reference terminal, a signal input terminal, and a comparison signal output terminal, said reference terminal of each of said comparators being coupled to a different one of said taps of said voltage divider, said signal input terminal of each of said comparators being coupled in common to said ramp generating means, each of said comparators being for performing a comparison of said ramp signal with that one of said divided reference signals appearing at the corresponding one of said taps, and coupling to a corresponding one of said synchronizing signal output ports, for generating one of said synchronizing signals, whereby said energy units produce said current pulses in recurrent sequence, which thereby tends to reduce ripple in said direct voltage.

2. A supply according to claim 1, wherein said reference voltage source comprises detection means coupled to said ramp generating means for generating said reference voltage.

3. A supply according to claim 2, wherein said detection means comprises peak detection means.

4. A supply according to claim 1, wherein said phase synchronizing means further comprises:
   controllable switch means coupled to at least some of said signal divider elements for controllably short-circuiting individual ones of said signal divider elements of said voltage divider to thereby affect the signal division ratio by which said reference signals are generated;
   and said supply further comprises:
   control means coupled to said controllable switch means for selectively one of open-circuiting and short-circuiting each one of said divider elements, whereby said recurrent sequence readjusts in accordance with those of said divider elements which are not short-circuited.

5. A supply according to claim 1, wherein said ramp generating means comprises:
   timing means coupled to receive said master synchronizing signal, for generating a first and second of equal-duration subsidiary master synchronizing signals in response to each one of said master synchronizing signals;
   first and second sawtooth signal generating means for generating first and second sawtooth signals, each of said first and second sawtooth signals generating means being coupled to said timing means for receiving at least one of said subsidiary master synchronizing signals, each of said first and second sawtooth signal generating means including: (a) a source of current coupled to a capacitance means for generating a first monotonic signal portion of said sawtooth signal in response to presence of one of said first and second subsidiary master synchronizing signals; and (b) switch means coupled across said capacitance means for discharging said capacitance means to form an unwanted second monotonic signal portion of said sawtooth signal in response to the other one of said first and second subsidiary master synchronizing signals;
   multiplexing switch means coupled to said first and second sawtooth signal generating means and to said timing means, for passing successive ones of said first monotonic signal portions of said first and second sawtooth signals, and for not passing said unwanted second monotonic signal portions of said first and second sawtooth signals, for thereby forming said ramp signals.

6. A supply according to claim 1, wherein each of said energy units includes:
   self-diagnostic means for generating GO/NO-GO signals representing the current operational status of that one of said energy units; and further comprising:
   means for coupling said GO/NO-GO signals to said control means for control of the short-circuit state of the associated one of said signal divider elements, whereby said recurrent sequence responds to the operational status of said energy units.

7. A multiunit power supply for supplying direct voltage to a load, comprising:
   a current-integrating capacitor coupled across said load for integrating current pulses for generating said direct voltage;
   a plurality of energy units, each of which includes a synchronization signal input port, and each of which also includes a current output port coupled to said current-integrating capacitor for supplying current pulses thereto in response to periodic synchronizing signals applied to said synchronization signal input port;
   a source of master synchronizing signals;
   phase synchronizing means including a master synchronizing signal input port coupled to said source of master synchronizing signals, and also including a plurality of synchronizing signal output ports, each of which synchronizing signal output ports is coupled to the synchronizing signal input port of one of said energy units, said phase synchronizing means further including: (a) ramp generating means coupled to receive said master synchronizing signals for generating successive ramp signals in synchronism with said master synchronizing signals; (b) detection means coupled to said ramp generating means for generating a reference signal; (c) a voltage divider including a plurality of taps at least equal in number to the number of said energy units, and equal-value signal divider elements, each of which is coupled between two adjacent taps, said voltage divider being coupled to said detection means, for forming a plurality of divided reference signals at the taps of said voltage divider, the divided reference signal at each of said taps being in a different proportion to said reference; (d) controllable switch means coupled to at least some of said signal divider elements for controllably short-circuiting individual ones of said signal divider elements of said voltage divider to thereby affect the signal division ratio by which said reference signals are generated; (e) a plurality of comparators, each including a reference terminal, a signal input terminal, and a comparison signal output terminal, said reference terminal of each of said comparators being coupled to a different one of said taps of said voltage divider, said signal input terminal of each of said comparators being coupled in common to said ramp generating means, each of said comparators being for performing a comparison of said ramp signal with that one of said divided reference signals appearing at the corresponding one of said taps, and coupling to a corresponding one of said synchronizing signal output ports, for generating one of said synchronizing signals, whereby said energy units produce said current pulses in recurrent sequence, which thereby tends to reduce ripple in said direct voltage; and
   control means coupled to said controllable switch means for selectively one of open-circuiting and short-circuiting each one of said divider elements, whereby said recurrent sequence readjusts in accordance with those of said divider elements which are not short-circuited.

8. A spacecraft comprising:
   a solar panel for being insolated, and for when insolated, producing electrical power;
   equipment constituting an electrical load requiring direct voltage;
   electrical energy storage means coupled to said solar panel for storing electrical energy during at least a portion of said insolation;
   a current-integrating capacitor coupled across said load for integrating current pulses for generating said direct voltage;
   a plurality of energy units, each of which includes a power input port coupled to at least one of said solar panels and said electrical energy storage means, and each of which includes a synchronization signal input port, and each of which also includes a current output port;
   a source of master synchronizing signals; and
   phase synchronizing means including a master synchronizing signal input port coupled to said source of master synchronizing signals, and also including a plurality of synchronizing signal output ports, each of which synchronizing signal output ports is coupled to the synchronizing signal input port of one of said energy units, said phase synchronizing means further including: (a) ramp generating means coupled to receive said master synchronizing signals for generating successive ramp signals in synchronism with said master synchronizing signals; (b) a reference voltage source; (c) a voltage divider including a plurality of taps at least equal in number to the number of said energy units, and equal-value signal divider elements, each of which is coupled between two adjacent taps, said voltage divider being coupled to said reference voltage source, for forming a plurality of divided reference signals at the taps of said voltage divider, the divided reference signal at each of said taps being in a different proportion to said reference; (d) a plurality of comparators, each including a reference terminal, a signal input terminal, and a comparison signal output terminal, said reference terminal of each of said comparators being coupled to a different one of said taps of said voltage divider, said signal input terminal of each of said comparators being coupled in common to said ramp generating means, each of said comparators being for performing a comparison of said ramp signal with that one of said divided reference signals appearing at the corresponding one of said taps, and coupling to a corresponding one of said synchronizing signal output ports, for generating one of said synchronizing signals, whereby said energy units produce said current pulses in recurrent sequence, which thereby tends to reduce ripple in said direct voltage.

* * * * *